United States Patent Office 3,592,767
Patented July 13, 1971

3,592,767
LAMINATED FILTER SHEETS AND FILTER ELEMENTS AND PROCESS FOR MAKING THE SAME
David B. Pall, Roslyn Estates, N.Y., assignor to Pall Corporation, Glen Cove, N.Y.
Continuation-in-part of application Ser. No. 616,028, Feb. 14, 1967. This application Apr. 23, 1970, Ser. No. 31,104
Int. Cl. B01d 39/16
U.S. Cl. 210—490                                30 Claims

ABSTRACT OF THE DISCLOSURE

Laminated filter sheets, a process for making them and filter elements made of such laminated filter sheets are provided. A composite of a microporous filtering ply, and a reinforcing ply comprising a thin porous sheet composed at least in part of potentially adhesive fabric is subjected to pressure under conditions potentiating the adhesive of the reinforcing ply to effect a bond between the fabric and the surface of the filtering ply in contact therewith without substantially decreasing the porosity of the filtering ply. The resulting filter sheet or element can be fitted with end caps for supporting the filter sheet in a housing for the filtration of fluid.

---

This application is a continuation-in-part of Ser. No. 616,028, filed Feb. 14, 1967, now abandoned.

This invention relates to multi-ply laminated filter sheets, especially useful in corrugated filters, and to a process for making the same. More particularly, it relates to a thin filter laminate having a filtering ply and a reinforcing ply, which can be folded into corrugations and heat-set to make them rigid and strong, and in which when formed in a closed configuration the corrugation bases can be bonded together to form a rigid structure, thus forming a filter element capable of resisting high fluid pressure differentials, despite the thinness of the filter medium, and to a process for making the same.

Filter elements are generally corrugated to increase the filtering area available for a given package size. It is highly desirable to provide a large filtering surface in order to obtain the longest possible interval between the start of flow and the clogging of the element. However, the provision of a large filtering surface by the corrugation of a fine filtering medium, such as those capable of quantitative removal of bacteria or yeast, is a difficult problem. Such filters have very small pores, and are made of filter sheets composed of fibrous material of very fine diameter. For a large flow capacity such sheets should and can be quite thin, but if they are thin they lack mechanical strength, and if made in corrugated form the corrugations have a tendency to collapse against each other as well as internally, even at low fluid differential pressures across the filter. Furthermore, rupture of a thin sheet can more easily occur, and thus filter elements made of such sheets tend to be fragile and easily damaged during manufacture, assembly into the filter housing, storage and shipping. Furthermore, such an element has a flimsy feel and appearance and therefore creates a poor impression on a prospective purchaser.

The problem is not as acute with filter sheets of larger pore size, because these are made of a fibrous material that is sufficiently large in diameter to be quite strong even when the sheets are thin. Accordingly, one way of forming a fine filter that is sufficiently strong to be susceptible of withstanding high fluid pressure differentials when in corrugated form is to deposit a microporous layer upon a coarse substrate. The coarse substrate can be made of strong material, and accordingly provides a reinforcing support for the microporous layer, while at the same time the microporous layer reduces the porosity of the coarse layer so as to produce a fine filter in the composite. Filters of this type are described in U.S. Pats. No. 3,158,532, dated Nov. 24, 1964, 3,238,056, dated Mar. 1, 1966, and 3,246,767 dated Apr. 19, 1966, to David B. Pall and Cyril Keedwell.

U.S. Pat. No. 2,554,814 to Catlin et al., dated May 29, 1951, describes a filter material prepared by laminating several plies of crepe tissue paper, impregnating the layers with a synthetic resinous material and thereby bonding them together to form the laminate. This impregnated material has a higher strength, due to the impregnation and the bonding effect of the resin, but the impregnation also reduces porosity and flow capacity, and in a fine filter element such a reduction is particularly disadvantageous.

In accordance with the instant invention, thin laminated filter sheets are provided that are unusually strong for their thinness, having a filtering ply laminated to a reinforcing ply which does not substantially decrease the porosity or flow capacity of the filtering ply. One or more filtering plies and one or more reinforcing plies can be used. It is generally preferred that reinforcing plies be provided on each outside face of the laminated sheet. This laminated sheet, due to its unusual thinness and high strength, can be formed into filter elements with closely spaced corrugations, having an extremely high surface area for a given size, and resistant to collapse or rupture at high fluid pressure differentials.

The liminated sheet can include any type of filter sheet or layer as the filtering ply. The reinforcing ply employed in accordance with the invention as an essential feature is a porous fabric of which at least a proportion comprises potentially adhesive fibers that are capable of being softened by heat and/or by solvent action so as to adhere to the surface of any filtering ply in contact therewith as well as to each other, and to other fibers of the reinforcing ply, if not so bonded already. A small proportion of potentially adhesive fibers can also be present in the filtering ply.

Accordingly, laminated filter sheets in accordance with this invention can be set in any desired configuration, simply by rendering the potentially adhesive fibers adhesive after the laminated sheet has been formed into the desired configuration, and then effecting the bond and the set between the reinforcing ply and the filtering ply, and between adjacent contacting surfaces of the reinforcing ply. The bonding setting process is referred to hereinafter as potentiation of the adhesive fibers, in the sense in which the term is used in the fiber art.

In consequence, the laminated filter sheets of the invention are particularly well suited for being formed into a corrugated configuration, in which configuration they can be set by potentiation of the adhesive fibers of the reinforcing ply, after which the corrugated filter sheets have a remarkable rigidity and strength, despite the thinness of the laminated filter sheet of which it is composed.

The invention accordingly provides a process for forming corrugated laminated filter sheets. In this process, a multi-ply composite comprising at least one filtering ply and at least one reinforcing ply of porous fabric including a proportion of potentially adhesive fibers, is laminated by subjecting the composite to pressure under conditions potentiating the adhesive fibers, to effect a bond to each other, to other fibers in the reinforcing ply, if not integrally united or bonded together already, and to fibers of the filtering ply in contact therewith. If the laminate is to be corrugated, this can be done before the fibers are bonded. To facilitate the corrugating, a composite containing thermoplastic fibers can be brought to a temperature at which, or wet with a solvent by which, the fibers are softened and readily folded. The fibers and consequently the plies are set in the resulting corrugated form by cooling them to below their softening temperature thereafter, or by removing the solvent.

Preferably, the internal faces of the corrugations are bonded only at their bases rather than over the entire height of the corrugations, so that sufficient space between the peaks of the corrugations is available to permit area of the filter.

If desired, the corrugations can be so closely spaced that the adjacent external or internal faces of adjoining corrugations are brought into contact, and then they can be bonded to each other by way of the potentially adhesive fibers, thus producing a corrugated pack in which the corrugations are bonded together at adjacent external and/or internal faces. In such filter elements, filtering flow proceeds not cross-wise of the filter, as is conventional in a corrugated filter, but lengthwise of the corrugations, along the pleats, entering the corrugations at one end and leaving the corrugations at the opposite end as in U.S. Pat. No. 3,057,481 to Pall dated Oct. 9, 1962.

The invention as a further feature provides a corrugated filter element formed in a closed configuration in which the bases of the corrugations are bonded to each other, thus rigidifying the structure, and preventing relative movement of the corrugations with respect to each other. This bond is effected between the abutting corrugation bases when the adhesive fibers are potentiated, and can be obtained in any case where the inner reinforcing ply of the laminate comprises such fibers. In addition, if an outer reinforcing ply also comprises such fibers, then the bases of the corrugations are also bonded together internally, in effect forming a closed ring at the bases of the corrugations.

The filtering ply of the laminated filter sheets of the invention can be any filter sheet material that is sufficiently flexible so that it can be corrugated. It can be made of fibrous material, or of particulate material, or of mixtures of the two. If it is of particulate material, the particles are preferably bonded together so as to form a self-sustaining sheet or film. Filtering plies made of fibrous material or mixtures of fibrous material and particulate material including at least 25% fibrous material are preferred.

Fibrous material plies can be woven or nonwoven, as desired. However, inasmuch as the filtering ply is supported on a reinforcing layer, the higher tensile strength of a woven fabric is not required and consequently the less expensive nonwoven plies are preferred. Thus, there can be employed not only textile fabrics and cloths but also papers, mats, bats, and felts. Exemplary filtering plies are paper, including papers made of cellulose pulp and of synthetic fibers and mixtures of the same, asbestos paper, asbestos mats and felts, mineral wool mats and felts, and mats, felts and fabrics made of Manila or Indian hemp, jute, linen, cotton, silk, wool, mohair, glass, nylon, polyethylene, polypropylene, polyacrylonitrile, terephthalic acid-ethylene glycol copolymers, and polyvinyl chloride fibers. Woven and nonwoven plies comprising all or only a portion of metallic fibers also can be used. Typical metallic fibers include iron, copper, aluminum, stainless steel, brass, Monel, silver and titanium.

Particulate material which can be employed in conjunction with the fibrous material or per se in bonded structures include polyvinyl chloride, polyethylene, polypropylene, polystyrene, diatomaceous earth, bentonite, copolymers of vinyl chloride and vinyl acetate, monmorillonite, polyamides, polytetrafluoroethylene, trichlorofluoroethylene polymers, iron, stainless steel, copper, aluminum, brass, Monel, silver and titanium.

Inasmuch as the filter laminates of the invention can include two or more plies, any combination of different plies of the above materials can be employed, for special filtering effects.

The filtering ply should have as high a proportion of open area as possible. Because of the support given by the reinforcing ply, it need not even be self-supporting, but can be transferred from a supporting sheet on which it is prepared to the reinforcing ply. The percent voids volume is above 60%, and preferably above 75%. In some cases, open areas as high as 90 to 95% are possible.

The amount of open area is a function of fibers and/or particle size, thickness and density. For a given fiber and/or particle size, a thin layer will usually have a larger proportion of open area available for filtration, i.e., in the form of pores extending across the ply from one side to another, than a thicker layer. Consequently, the thinner the ply, the better.

Thinness gives an advantage in surface area also. The thinner a sheet, the more closely spaced the corrugations or folds can be, and thus, the more area that can be packed into a given volume.

The objective of the invention is realized in a greatly increased strength of the filter sheet for a given thickness, and in view of the above considerations, the invention finds its greatest application in the production of thin laminated sheets. Therefore, it is preferred that the filtering and reinforcing plies be quite thin.

Filtering plies as thin as 0.008 inch are very satisfactory, and can be employed, for maximum flow capacity for a given pore size. The ply, if desired, can be thicker, and plies having a thickness within the range from 0.008 to 0.025 inch are perfectly satisfactory. It is generally preferred that the filtering plies have a thickness within the range from about 0.008 to 0.010 inch. Such sheets give corrugated sheets in which the corrugations can be spaced at from 5 to 25 corrugations/inch and preferably from 13 to 22 corrugations/inch.

The filtering plies are obtained using small diameter fibrous material and/or small particles. The diameter of fibers and/or particles is important in defining the size of the spaces between them, and therefore the size pores as well as the percent open area or voids volume. The fibrous materials that are generally employed have a fiber diameter within the range from about 0.1 to 25 microns. Such fibers give filtering plies having a pore size within the range from about 0.3 micron to 30 microns, on the average. The preferred fibrous materials have diameters within the range from about 0.1 micron to 0.5 micron, and these materials give filtering plies having a pore size within the range from about 0.3 to 0.5 micron, and are especially suitable for filtration of bacteria from water.

It will of course be appreciated that the pore size obtainable from a given fiber can be and suitably is modified by addition of a particulate material. In general, the addition of a proportion of particulate material ranging upwards from 5 to about 75% can reduce the pore size considerably. The effect is in fact similar to that obtained when particulate material is employed in combination with fibrous material, as in the process of U.S. Pats. Nos. 3,158,532, 3,246,767, and 3,238,056, mentioned above.

The reinforcing ply is a thin porous fabric composed wholly or partially of potentially adhesive fibers and sufficiently flexible to be formed into the desired shape and can be heat and/or solvent bonded to itself and to the filtering ply at all contact points. The fabric can be in the form of a woven or nonwoven fibrous material screen or mesh, extruded mesh or expanded slitted sheets or netting. Extruded or expanded mesh or netting is quite similar in resemblance and structure to woven mesh, the difference being that the former is formed from a single sheet, so that the strands are integral with each other and comprise common material at their intersection points, rather than overlapping as in the latter.

The term "fibers" are used herein is inclusive of strands, filaments, monofilaments, and multifilament strands, fibers or yarns.

The reinforcing ply is formed of fibrous material of which at least 5%, and preferably at least 25%, is of potentially adhesive fibers. Such fibers can comprise as much as 100% of the reinforcing ply. However, reinforcing plies composed entirely of potentially adhesive fibers are more difficult to handle in processing equipment in large scale production, because of the danger of disintegration of the structure when the fibrous material is rendered adhesive. Consequently, it is usually preferred that the potentially adhesive fibers not exceed about 75% of the material. Best results are obtained when the potentially adhesive fibers comprise from about 35 to about 60% by weight of the ply.

The potentially adhesive fibers can be thermoplastic, or solvent-softenable, or both. It is not necessary that more than the surface be potentially adhesive, so that it is possible to employ fibers which are coated with a thermoplastic or solvent-softenable material. However, such fibers are more costly than fibers made entirely of thermoplastic or solvent-softenable material, and consequently, the latter are generally preferred.

Typical potentially adhesive fibers include polyvinyl chloride, polyamides, polyethylene, polypropylene, polyacrylonitrile, ethylene glycol-terephthalic acid copolymers, acetate rayon, ethyl cellulose, viscose rayon, alginate fibers, polyvinylidene chloride, copolymers of vinyl chloride and vinyl acetate, and polystyrene.

The reinforcing ply can and usually will supplement the filtering action of the filtering ply. In general, however, its pore size will be greater than the pore size of the filtering ply, and it should have a flow capacity at least as high as the filtering ply.

Since the reinforcing ply fabric can have a larger pore size than the filtering ply, it can and desirably is made of thicker and therefore stronger fibers than the filtering ply. Such fibers define openings of larger pore size than the filtering ply pores and thus the ply can be made to have a large flow capacity, due partly to the large pores, and considerable strength, as well as a greater thickness.

Considerations such as flow capacity and strength are used to determine the fiber thickness and the pore size of the reinforcing ply. Where drainage flow passages are not a criterion, the reinforcing ply will usually have a thickness within the range from about 0.0015 to about 0.05 inch, and a pore diameter within the range from about 0.004 to about 0.1 inch, preferably from about 40 to about 150 microns.

If desired, the potentially adhesive fibers in the reinforcing ply can be confined to one surface, so that when the ply or laminate is brought to a temperature at which the adhesive properties of the fibers are potentiated, only the fibers on that side will be bonded. Such a layer is particularly adapted for use as the outer layer in the filter laminates of the invention.

It is also possible to employ a reinforcing ply that contains potentially adhesive fibers on both surfaces. Such a material is useful as an inner ply between two filtering plies, and is capable of bonding both plies on each side to the reinforcing ply. Such double-sided reinforcing plies can also of course be employed as the outer surface layer.

A preferred nonwoven fibrous reinforcing ply is a lightweight paper formed of long staple fibers, so as to have an extremely porous structure, and having polyvinyl chloride polymer fibers, such as polyvinyl chloride homopolymer or the copolymers of chloride and vinyl acetate in admixture with cellulose fibers, throughout the paper or confined to one side.

If the potentially adhesive fibers are thermoplastic, it is preferred that they have a softening temperature within the range from about 75 to about 250° C. The lower limit of softening temperature should be sufficiently high, above the use temperatures of the material, so that the laminated filter sheet is not softened and destroyed under the conditions of use. The upper limit is set by the decomposition limit of the other components of the laminated sheet and the capability of the equipment in which the filter sheet is processed.

Solvent-softenable materials are frequently desirable since they avoid the necessity of forming and setting the corrugated filter laminate at elevated temperatures. However, they have the disadvantage of requiring removal of solvent after the processing is completed, with its attendant costs and hazards.

Many solvent-softenable materials are also thermoplastic, but not all. Viscose rayon, for example, is solvent-softenable, but is not thermoplastic, while polyethylene, polyamide, and polyvinyl chloride fibers are both. The solvent that is used is a solvent for the material of which the fibers are composed. Such solvents are known, and are given in the literature; for example, Marsden, Solvents Manual, Elsevier Press, Inc., 155 E. 82nd St., New York, N.Y.

To increase the strength of the bond between the filtering ply and the reinforcing ply, a small proportion of potentially adhesive fibers can be included in the filtering ply. The proportion need not be large. As little as 0.25% can suffice. The amount should not exceed 10%, and preferably does not exceed 5%, because of the danger of changing the pore dimensions of the ply while the fibers are softened by heat and/or a solvent.

The laminated filter sheets of the invention are easily prepared. A composite is made by assembling the filtering plies and reinforcing plies in the order desired in the final product. The outer surface layers on each side are preferably made of reinforcing plies, and these plies can have an outer face including potentially adhesive fibers, if it is desired to bond adjacent faces of the corrugations of the finished product together to form a more rigid structure.

If the laminated filter sheet is to be used without corrugations, the potentially adhesive fibers then are rendered adhesive by application of heat, or a solvent, or both, and the structure is then allowed to set, so that bonding of the plies can be effected. Either before or after the adhesive fibers have set, preferably before, the laminated sheet is formed into the desired configuration. Generally, filter elements are formed in a closed configuration, which can be of any desired geometric shape, such as, flat, i.e., a wafer, cylindrical, polygonal, elliptical, square or rectangular, as desired. The adhesive fibers after setting will aid in retaining the filter sheet in this configuration despite the overall thinness of the filtering ply and the laminated sheet.

If the laminated filter sheet is to be corrugated, it is best to corrugate the sheet before the adhesive fibers have been set. This can be done using conventional corrugating equipment. To facilitate corrugating, any thermoplastic fibers can be brought to an elevated temperature at which they are soft, and bend more readily during formation of the corrugations. After the adhesive fibers have set, the corrugated form of the filter sheet is retained. Then, before or after the fibers have set, the filter sheet is put into the desired configuration for the element, such as a fan wafer or corrugated filter cylinder, cone, truncated cone, hexagonal cylinder, octagonal cylinder, or box-shaped structure.

During adhesion and bonding of the adhesive fibers it is usually desirable to apply pressure to the sheet so as to improve the strength of the bond that is formed. High pressures are not required, and in general are undesirable, because they can cause distortion of the softened adhesive material, with the result that it will enter into the open spaces of the plies and reduce porosity. Therefore, the minimum pressure to form a bond without substantial distortion of the adhesive fibers during bonding is usually all that is used. In general, pressures within the range from 5 grams to about 250 pounds per square inch are quite adequate.

The bonding conditions are selected so as to affect only the adhesive fibers of the reinforcing ply and any potentially adhesive fibers in the filter ply, but, not the fibers or other material of the laminated sheet. If a solvent is used, the solvent should be inert to the other components of the sheet, attacking and softening only the potentially adhesive fibers. In addition, the conditions must be chosen so that after bonding the reinforcing ply retains its identity as woven or unwoven mesh, extruded mesh or netting, or expanded slitted sheet, or whatever other form of material is utilized. This is important since if the fibers of the reinforcing ply do not retain their shape and configuration but melt or dissolve to a substantial extent, the pore size of the filtering ply will be adversely affected due to wicking and obstruction of the pores. Furthermore, the reinforcing ply will lose much of its strength, if it undergoes a significant loss of shape and configuration, and will not serve either to support the filtering ply or act as an efficient drainage member. Thus, the temperature, the pressure applied and the amount of solvent used must be carefully controlled so that the reinforcing ply retains its character during bonding.

When reinforcing plies are employed on both sides of the filter laminate, the composite structure has extremely high strength and is quite versatile. In a corrugated cylindrical form, both the internal and external faces of the corrugations can be bonded together by the potentially adhesive reinforcing ply. A filter element so constructed can be used in a manner such that flow can either pass from the exterior to the interior or vice versa, without rupturing or distorting the corrugations. This permits the filter to be flush-cleaned by backwashing without causing damage.

When the laminated filter sheet is closely corrugated with the corrugation sides abutting and in contact or even bonded together, the abutting fibers or strands of the reinforcing ply define flow passages extending longitudinally and crosswise of and parallel to the side faces of the corrugations. In this case, the reinforcing ply serves as an efficient drainage member to pass fluid from the inside of the corrugations to the outside of the corrugations.

In order for the reinforcing ply to function as an efficient drainage member, the pores or openings therein must be substantially larger than the pores in the filtering ply. Openings which are at least approximately three times the size of the 30 micron pores in the filtering ply or greater satisfactorily fulfill this requirement. Thus, a reinforcing ply having pores or openings within the range from about 0.004 inch (100 micron) to 0.1 inch in size is desirable. Similarly, the thickness of the reinforcing ply must be increased for the strands or fibers to define adequate flow passages. To accomplish this thickness is preferably within the range from about 0.005 inch to 0.05 inch.

Where downstream drainage is an important consideration, it is preferable that the reinforcing ply comprise woven mesh or extruded netting fabric with square or diamond shaped openings defined by a plurality of strands having a count in the range from about 8 x 8 to 100 x 100 per square inch and a corresponding strand diameter within the range from about 0.050 inch to about 0.005 inch. It is desirable that the overall thickness of the mesh or netting be approximately equal to and no greater than a single strand diameter. This is inherent in extruded netting, and can be readily accomplished in woven mesh by rolling. The uniform thickness ensures that a large percentage of the strands of the reinforcing ply will contact the filtering ply and thus provide a strong bond between the contacting surfaces.

The following examples represent preferred embodiments of the invention in the opinion of the inventors.

EXAMPLE 1

Figure 3:
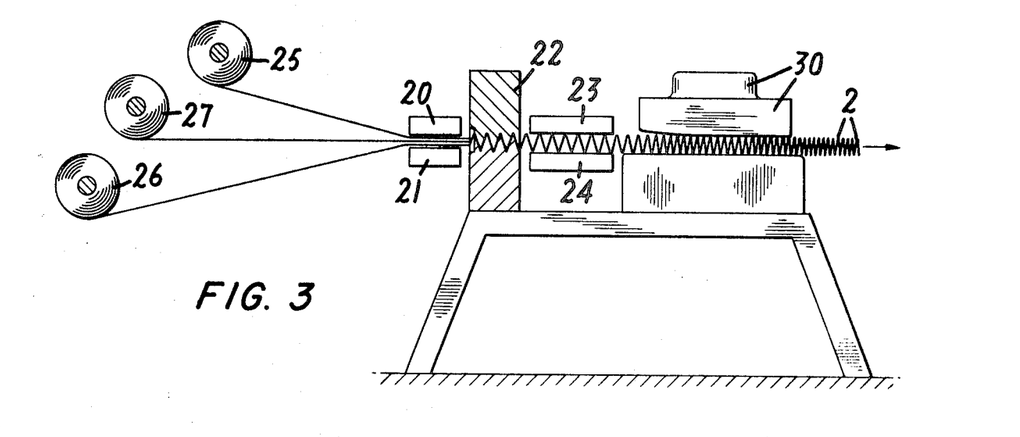
FIG. 3 is a schematic view of an apparatus for carrying out the process of preparing the corrugated filter sheet of FIG. 1.

The apparatus shown in FIG. 3 comprises a preheater in the form of a pair of platens 20, 21, a corrugator 22, and an after-heater in the form of a pair of platens 23, 24. A three ply corrugated laminated filter sheet in accordance with the invention was formed using this apparatus in the following manner.

Storage supplies of heat-sealable paper as the reinforcing ply were provided at 25 and 26. The paper 25 was a single-sided heat-sealable paper, 0.004 inch thick and 9%₁₆ inch wide, consisting of a cellulose paper sheet including Vinyon (copolymer of vinyl chloride and vinyl acetate) fibers on one side only. This paper had a nominal pore size of 75 microns. The paper 26 was a double-sided heat-sealable paper, 0.0035 inch thick and 9%₁₆ inch wide, composed of a mixture of cellulose fibers and Vinyon fibers (copolymer of vinyl chloride and vinylacetate) dispersed throughout the paper, making it heat-sealable on both sides. This paper had a nominal pore size of 125 microns.

Storage supply 27 was of the filtering ply. This was 0.010 inch thick and 9%₁₆ inch wide, having a maximum pore size of approximately 0.6 micron. This sheet was a nonwoven self-supporting mat of asbestos fibers, made by the following procedure:

An asbestos composition consisting of a basic aproximately 0.2 micron diameter fiber, for example, blue African crocidolite, was broken down by mechanical crushing. Magnetite an other foreign material was removed so far as possible, and the material was then ball-milled in a detergent water solution at approximately 12 g. per liter concentration, while continuously recirculating a portion of the suspension through two stages of hydroclones, discarding approximately ¼ to ½ of the asbestos in the hydroclone underflow. The ball-mill was operated with fresh slurry withdrawn from the system continuously. The resulting suspension had a creamy consistency, and was quite free of lumps and coarse fibers. The average fiber length was 150 microns.

The second asbestos slurry was prepared using approximately 0.5 micron diameter asbestos fibers, dispersed in a detergent water solution at 16 g. per liter concentration, using a Cowles (high-speed, shearing type, toothed disk) dissolver. The average fiber length was about 320 microns.

A series of slurries were prepared by mixing these in a proportion of from 2 to 25% of the latter, added to 98 to 75% of the former, and the resulting slurries were then laid down on a sheet of paper fed onto a Fourdrinier screen prior to the head box. The slurry was formed into a layer on this paper, and the paper was then stripped off. The filter sheet had a thickness of less than 0.01 inch and a weight of under 5 g. per square foot. Tests showed that it was capable of completely removing a $10^{11}$ incidence of bacteria per square foot of filter area. This sheet was self-supporting but structurally weak.

The preheater platens of the apparatus of FIG. 3 were set at 250° F., the after-heater platens set at 275° F., and the corrugator set to form corrugations 0.410 inch deep.

The three layers were brought together in the nip of the platens of the preheater; the Vinyon fibers in the paper reinforcing plies were softened, facilitating the corrugation. At the higher temperature in the after-heater, the thermoplastic fibers were softened sufficiently and bonding was effected by applying a back pressure of 5 lbs./sq. inch to the laminated sheet, to bond the adjacent corrugation walls together. The back pressure was applied by placing approximately 15 pounds of superimposed steel weights 30 on the corrugated laminated sheet. Then the adhesive fibers were allowed to harden and set. The finished laminate retained the corrugated form, due to the setting action of the fibers, and all of the plies were bonded together by the bonding action of the fibers.

Figure 1:
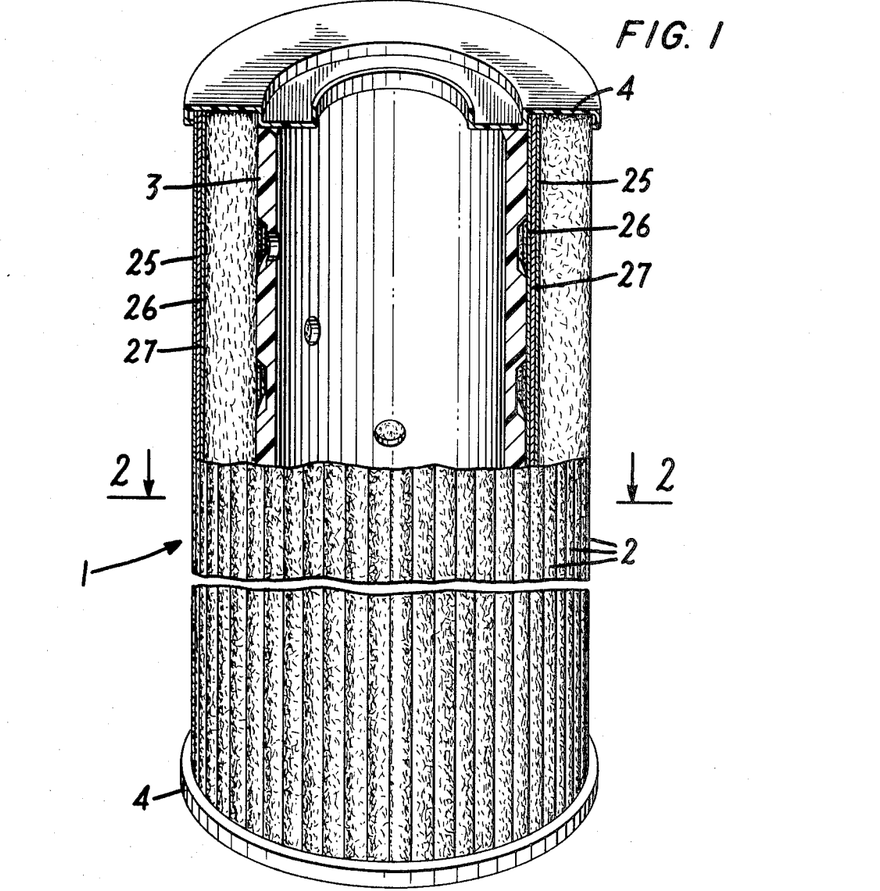
FIG. 1 is a perspective view, partly broken away, and in section, of a preferred embodiment of a filter element including the corrugated laminated filter sheet in accordance with the invention, in position enclosing a reinforcing core.
Figures 2, 2A:
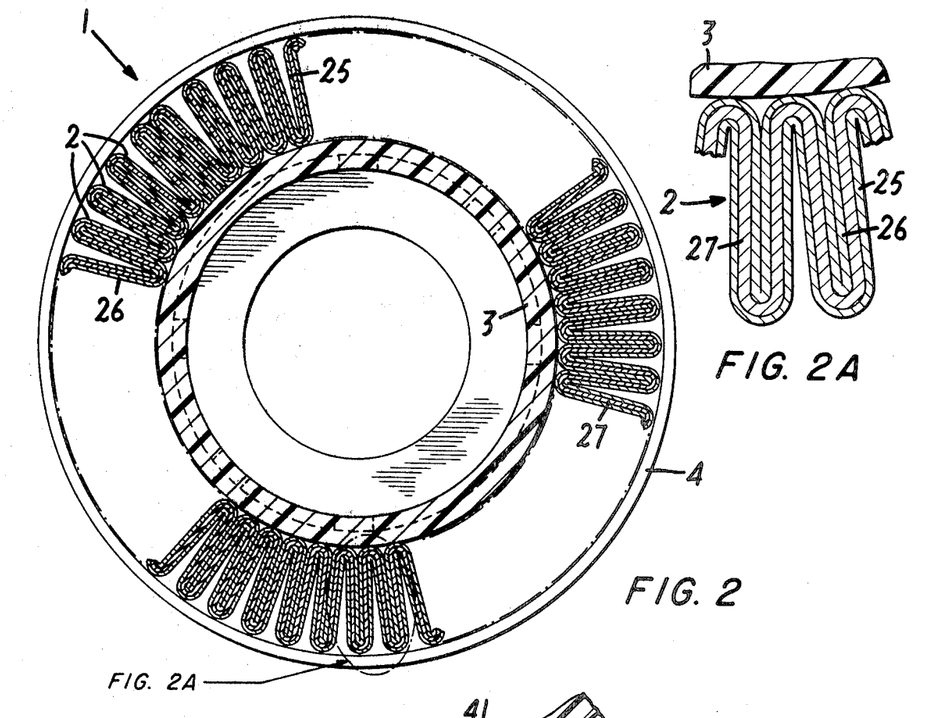
FIG. 2 is a view in cross-section along the lines 2—2 of the filter element of FIG. 1.
FIG. 2A is an enlarged view of a portion of FIG. 2.

The resulting pack 1 which had the apearance shown in FIGS. 1 and 2, was cut to a section approximately 6½ inches long, each containing 154 corrugations 2. This was wrapped around a 1.76 inch outside diameter support core 3, collapsed corrugation sides in, and the open seam sealed by application of an epoxy resin followed by an oven cure. The element was end-capped between polypropylene end caps 4, the inner surfaces of which were softened to effect adhesion between the end caps and the ends of the plies of the laminated filter sheet, as well as the thermoplastic fibers of the reinforcing plies. The resulting filter element had a pleasing appearance, and was relatively rigid, with strong, evenly and closely spaced corrugations. The effective filter area was 7.5 square feet.

Water was flowed through this element at a rate of 4 gallons per mintue, with a clean pressure drop of only 4 p.s.i., showing it had an excellent flow capacity due to a high voids volume.

For test purposes, a deflocculated suspension of a water-dispersing pigment grade of titanium dioxide, approximately 0.2 micron average particle diameter, was prepared by boiling the pigment in water, filtering, and resuspending the cake in water. This suspension was difficult to filter. For example, it passes completely and rapidly through a nominal 5 micron (Whatman No. 50) paper filter. Sixty grams of the suspension was added to the 4 g.p.m. water flow used in the previous test over a fifteen minute period. The pressure drop rose to 30 p.s.i., and over 98% of the titanium dioxide was removed. In contrast, the best dirt capacity up to this pressure drop using a 2.2 square foot element of conventional type in the same test, was 9 g. Thus, this give an improvement of over six times.

Addition of titanium dioxide was continued, up to 80 p.s.i. differential. The element remained intact, as evidenced by an increase in efficiency of removal from 98% to 100%. The extraordinary strength of this element despite the thinness of the filter laminate is thus evidenced by this test.

Another filter element was prepared using the same procedure from the corrugated pack obtained as described above. This was tested by passing through it a suspension of *Serratia marcescens*, a bacterium approximately 0.4 micron in diameter. The suspension influent fed to the filter contained a total of $10^{10}$ bacteria. The effluent showed a 100-fold reduction in bacteria content, or 99% removal of the bacteria.

EXAMPLE 2

A three-ply filter element was prepared using the apparatus shown in FIG. 3, and with the same paper reinforcing plies, but substituting a filter medium prepared by the procedure described, but having a 0.45 micron pore size. This filter element was corrugated and formed into a cylinder as described in Example 1, and then used to separate *Serratia marcescens*. The suspension influent fed to the filter contained a total of $10^4$ bacteria. The effluent showed 99.99% removal.

EXAMPLE 3

A laminated filter sheet was prepared, employing the apparatus shown in FIG. 3, but five plies in all were corrugated. The outermost reinforcing ply was a single-sided heat-sealable paper, 0.004 inch thick and 9%16 inch wide, composed of a cellulose paper, having copolymer of vinyl chloride and vinyl acetate thermoplastic fibers on one side only. The next filtering ply was a 0.4 micron absolute filter sheet, composed of asbestos fibers and made in the same way as that described in Example 1. The next reinforcing ply was a double-sided heat-sealable paper, 0.0035 inch thick, and 9%16 inch wide, composed of a mixture of cellulose fibers and copolymer of vinyl chloride and vinyl acetate fibers dispersed throughout the paper, and then followed another ply of 0.4 micron absolute filter sheet, and then another reinforcing ply of the same double-sided heat-sealable paper. The resulting structure was far stronger than that in Example 1 and had an effective filter area in standard cartridge dimension (2.75 inches in diameter, 16 corrugations per inch) of 6 square feet. When this cartridge was tested, using *Serratia marcescens*, with $10^{11}$ bacterial in the influent flow, there were no bacteria detectable in the culture of the filtrate.

A second element prepared from the same corrugated pack was tested with titanium dioxide as in Example 1, and showed zero titanium dioxide downstream by a sensitive photocell test.

The 6 square feet of filter area in this filter should be compared with the best previous element of equal envelope diameter, capable of removing bacteria quantitatively. This contained 2.2 square feet of filter area, due to the wider spacing of the corrugations, because of the greater thickness of the filtering material. Depending on the type of contaminant, a 2.7 to 10 fold increase in dirt capacity can be expected for the 6 square foot element, as compared to a 2.2 square foot element.

Use of a double-sided heat-sealable reinforcing ply as the innermost ply of the filter provides a further advantage in that the element withstands higher differential pressures in the reverse-to-normal direction, e.g., about 6 p.s.i. v. less than 1 p.s.i. for a similar element without the heat-sealable double-sided ply.

EXAMPLE 4

A three ply corrugated laminated filter sheet in accordance with the invention, having only the bases of the corrugations bonded together, was formed using this apparatus in the following manner.

Storage supplies of heat-sealable paper, as the reinforcing ply were provided at 25 and 26. The papers were each double-sided heat-sealable paper, 0.0035 inch thick and 9%16 inch wide, composed of a mixture of cellulose fibers and Vinyon fibers (copolymer of vinyl chloride and vinyl acetate) dispersed throughout the paper, making it heat-sealable on both sides. This paper had a pore size of 125 microns.

Storage supply 27 was of the filtering ply. This was 0.010 inch thick and 9%16 inch wide, having a maximum pore size of approximately 0.6 micron. This sheet was a nonwoven self-supporting mat of asbestos fibers, made by the same procedure as Example 1.

The preheater platens of the apparatus of FIG. 3 were set at 250° F., the after-heater platens set at 275° F., and the corrugator set to form corrugations 0.410 inch deep. The after-heater platens were weighted by approximately 15 pounds of superimposed steel weights, applying a back pressure of 5 lbs./sq. inch to the laminated sheet, to bond the inside walls of adjacent corrugations together. However, back pressure was applied only to the top of the corrugated sheet, by using a convex surface on platen 23, and a matching concave surface on platen 24.

The three layers were brought together in the nip of the platens of the preheater; the Vinyon fibers in the reinforcing plies were softened, facilitating the corrugation. At the higher temperature in the after-heater, the thermoplastic fibers were softened sufficiently to effect bonding at the top of the corrugations in the sheet, against the platen 23, but not at the bottom of the corrugations in the sheet. Then the adhesive fibers were allowed to harden and set. The finished laminate retained the corrugated form, due to the setting action of the fibers, and all of the plies were bonded together at one end but not at the other, by the bonding action of the fibers.

Figure 4:
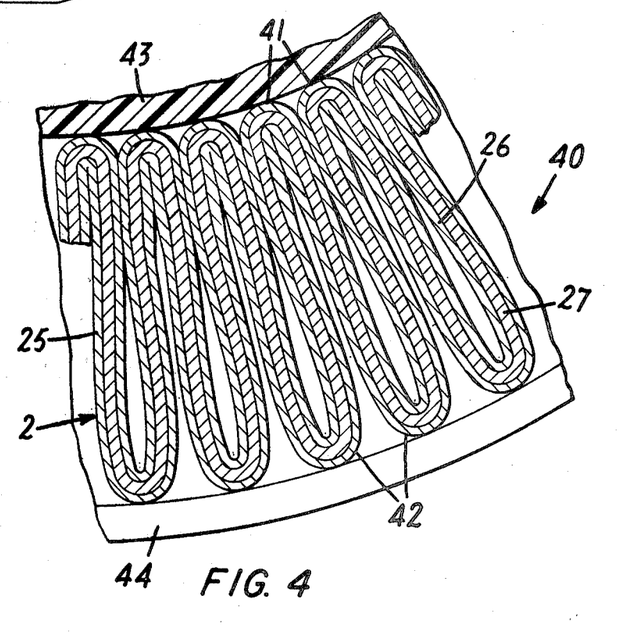
FIG. 4 is an enlarged view in cross-section and partly broken away of another type of filter element, in which the interiors of the bases of the corrugations are bonded together and the exteriors of the bases are bonded to each other.

The resulting pack 40 had the appearance in cross-section shown in FIG. 4 with the corrugation bases 41 bonded inside and out, and tops of the corrugations 42 were unbonded. The sheet was cut to a section approximately 6½ inches long, each containing 154 corrugations 2. This was wrapped around a 1.76 inch outside diameter support core 43, bonded corrugation base in, and the open seam sealed by application of an epoxy resin, followed by an oven cure. The element was end-capped between polypropylene end caps 44, the inner surfaces of which were softened to effect adhesion between the end caps and the ends of the plies of the laminated filter sheet, as well as the thermoplastic fibers of the reinforcing plies. The resulting filter element had a pleasing appearance, and was relatively rigid, with strong, evenly and closely spaced corrugations. The effective filter area was 7.5 square feet.

Water was flowed through this element at a rate of 4 gallons per minute, with a clean pressure drop of only 4 p.s.i., showing it had an excellent flow capacity due to a high voids volume.

EXAMPLE 5

A two ply corrugated laminated filter sheet having large drainage passages for the filtered fluid was formed using the apparatus of FIG. 3.

A storage supply of a thermoplastic reinforcing and drainage layer was provided at 26. The layer was a fabric of extruded polypropylene netting, known as Vexar, with diamond shaped openings having an equivalent diameter of approximately 0.050 inch and a thickness of approximately 0.010 inch. The openings were defined by a plurality of 0.010 inch diameter strands having a count of approximately 16 x 16 per square inch.

A storage supply of the filtering ply was provided at 27. This was 0.010 inch thick nonwoven self-supporting mat of asbestos fibers having a maximum pore size of approximately 0.6 micron and made by the same procedure as Example 1.

Storage supply 25 was of a spacing layer of 0.010 thick paper containing no potentially adhesive fibers. The preheater platens of the apparatus of FIG. 3 were set at 250° F., the after-heater platens set at 275° F., and the corrugator set to form corrugations 0.410 inch deep.

The three layers were brought together in the nip of the platens of the preheater; the polypropylene monofilaments in the Vexar reinforcing ply were softened, facilitating the corrugation. At the higher temperature in the after-heater, the thermoplastic monofilaments were softened sufficiently and bonding was effected by applying a back pressure of 5 lbs./sq. inch to the laminated sheet, to bond the adjacent corrugation walls together. The back pressure was applied by placing approximately 15 pounds of superimposed steel weights 30 on the corrugated laminated sheet. Then the adhesive strands were allowed to harden and set. The finished laminate retained the corrugated form, due to the setting action of the strands, and the two plies were bonded together. The resutling pack had the appearance shown in FIG. 5. The paper 27 maintained the proper spacing between the corrugations during the forming and bonding operations. Thereafter, the bond between the reinforcing ply 26 and the filtering ply 27 and the bond between the abutting monofilaments of the reinforcing ply on the internal faces of the corrugations held the pack in the as formed position, so that the paper spacing material could be and was stripped out.

Figure 5:
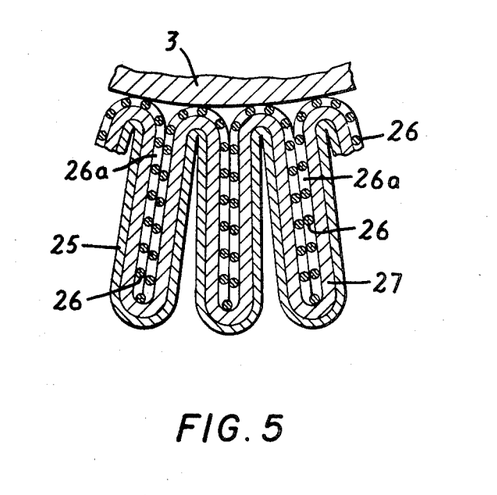
FIG. 5 is a partial cross-sectional view of a corrugated laminated filter sheet in which the fibers in the reinforcing ply form flow passages for the drainage of filtered fluid.

The relatively large diamond shaped openings in the reinforcing ply 26 had a high flow capacity and efficiently carried the filtered fluid from the downstream side of the filtering ply 25 without significantly increasing the differential pressure across the filter sheet. The abutting monofilaments of the extruded polypropylene netting on the internal faces of the corrugations define flow passages 26a for the filtered fluid. Therefore, when these were fuse-bonded to each other, the reinforcing ply served as a drainage member which did not obstruct the flow.

Water was flowed at the rate of 4 g.p.m. through 7.5 square feet of this corrugated filter sheet which was formed into a cylindrical filter element similar to FIG. 1. The resultant clean pressure drop was 3.8 p.s.i., showing an increase in flow capacity due to the drainage passages in the reinforcing ply.

Although the examples show the formation of the corrugated filter laminate into cylindrical filter elements, it will, of course, be understood that these corrugated packs can also be used in extended corrugated form, in an open as opposed to a close configuration, such as in a wafer, for uses where the large dimensions of a corrugated cylinder are unacceptable.

Having regard to the foregoing disclosure, the following is claimed as the inventive and patentable embodiments thereof.

1. A multi-ply laminated microporous filter sheet, comprising, in combination, at least one filtering ply comprising a microporous filter sheet having and average pore size of less than about 30µ; and at least one reinforcing ply comprising a porous fabric of a greater average pore size than the filtering ply and composed at least in part of potentially adhesive fibers; said filtering ply and reinforcing ply being bonded together by the fibers at a multiplicity of mutual contact points distributed throughout substantially the entire interface between the plies as a result of the potentiation of said adhesive fibers.

2. A laminated filter sheet in accordance with claim 1 having a reinforcing ply on each face, with the filtering ply sandwiched therebetween.

3. A laminated filter sheet in accordance with claim 1, in which the filtering ply has a thickness within the range from about 0.008 to about 0.025 inch and the reinforcing ply has a thickness within the range from about 0.0015 to about 0.05 inch.

4. A laminated filter sheet in accordance with claim 1, in which the filtering ply has a pore size within the range from about 0.3 to about 30 microns and the reinforcing ply has a pore size within the range from about 40 to about 150 microns.

5. A laminated filter sheet in accordance with claim 1, in which the reinforcing ply comprises a nonwoven fabric.

6. A laminated filter sheet in accordance with claim 1, in which the reinforcing ply is an open woven mesh fabric.

7. A laminated filter sheet in accordance with claim 6, in which the mesh is an extruded mesh of thermoplastic material.

8. A laminated filter sheet in accordance with claim 6, in which the filtering ply has a pore size within the range from about 0.3 to about 30 microns and the reinforcing ply has a pore size in the range from about 0.004 to about 0.10 inch.

9. A laminated filter sheet in accordance with claim 1, formed and set in corrugations.

10. A laminated filter sheet in accordance with claim 9, in which adjacent abutting faces of the corrugations are bonded together by the adhesive action of the potentially adhesive fibers of the reinforcing ply.

11. A laminated filter sheet in accordance with claim 9, in which only adjacent abutting bases of the corrugations are bonded together by the adhesive action of the potentially adhesive fibers of the reinforcing ply.

12. A laminated filter sheet in accordance with claim 1, comprising a plurality of filtering plies, each sandwiched between reinforcing plies.

13. A laminated filter sheet in accordance with claim 1, in which the filtering ply comprises a nonwoven sheet of fibrous material.

14. A laminated filter sheet in accordance with claim 1, in which the filtering ply comprises asbestos fibers and the reinforcing ply comprises a paper including a proportion of thermoplastic polyvinyl chloride resin fibers.

15. A laminated filter sheet in accordance with claim 1, in which the proportion of potentially adhesive fibers in the reinforcing ply is within the range from about 5 to about 75% by weight of the ply.

16. A laminated filter sheet in accordance with claim 1, formed and set in corrugations in which the reinforcing ply defines adjacent abutting faces of the corrugations bonded together and having flow passages therethrough between the faces of the corrugations.

17. A process for forming a multi-ply laminated microporous filter sheet comprising, in combination, forming a multiple composite of at least one filtering ply comprising a microporous filter sheet having an average pore size of less than $30\mu$ and at least one reinforcing ply in contact with the filtering ply and comprising a porous fabric of greater average pore size than the filtering ply composed at least in part of potentially adhesive fibers; and subjecting the composite to pressure under conditions potentiating the adhesive fibers in a manner to effect bonds to fibers of the filtering ply, and to each other and to other fibers of the reinforcing ply, the bonds being formed by the fibers at a multiplicity of mutual contact points distributed throughout substantially the entire interface between the plies.

18. A process in accordance with claim 17, in which the bond is effected by application of heat and pressure.

19. A process in accordance with claim 17, in which the bond is effected by application of heat and solvent for the potentially adhesive fibers.

20. A process in accordance with claim 17, which includes corrugating the laminated sheet before the potentially adhesive fibers are set, so as to fix the corrugations in the sheet.

21. A process in accordance with claim 20, which includes bonding adjacent faces of the corrugations to each other.

22. A process in accordance with claim 20, which includes bonding only adjacent bases of the corrugations to each other.

23. A process in accordance with claim 20, which includes forming the corrugated sheet into a cylinder; bringing the free side edges of the sheet together to form a closed side seal; and bonding end caps to each open end of the corrugated cylindrical filter.

24. A filter element comprising, in combination, a laminated microporous filter sheet composed of at least one microporous filtering ply having an average pore size of less than about $30\mu$, and at least one porous reinforcing ply of greater average pore size than the filtering ply; said reinforcing ply comprising a porous fabric of a greater average pore size than the filtering ply and composed at least in part of potentially adhesive fibers, said reinforcing ply and said filtering ply being bonded together by the adhesive fibers at a multiplicity of mutual contact points distributed throughout substantially the entire interface between the plies as a result of the potentiation of the adhesive fibers which substantially retain their identity as fibers; and support means bonded to the edges of the filter sheet and adapted to support the filter sheet in a housing for filtering fluid passing through the housing.

25. A filter element in accordance with claim 24, in which the filter sheet is formed in a closed configuration, and is supported by a core.

26. A filter element in accordance with claim 24, in which the support means comprises end caps.

27. A filter element in accordance with claim 26, in which the end caps are of thermoplastic resin and are heat-bonded to the ends of the plies, including potentially adhesive material of the reinforcing ply.

28. A filter element in accordance with claim 24, in which the laminated filter sheet is corrugated.

29. A filter element in accordance with claim 28, in which adjacent faces of the corrugations are bonded together.

30. A filter element in accordance with claim 28, in which adjacent bases of the corrugations are bonded together.

References Cited

UNITED STATES PATENTS

| | | | |
|---|---|---|---|
| Re. 24,081 | 10/1955 | Webb et al. | 210—460 |
| 2,675,127 | 4/1954 | Layte | 210—493 |
| 2,759,610 | 8/1956 | James | 210—493 |
| 3,012,918 | 12/1961 | Schaar | 161—112 |
| 3,013,667 | 12/1961 | Jackson et al. | 210—493 |
| 3,252,484 | 5/1966 | Meyer et al. | 161—92 |

REUBEN FRIEDMAN, Primary Examiner

T. A. GRANGER, Assistant Examiner

UNITED STATES PATENT OFFICE
CERTIFICATE OF CORRECTION

Patent No. 3,592,767          Dated July 13, 1971

Inventor(s) DAVID B. PALL

It is certified that error appears in the above-identified patent and that said Letters Patent are hereby corrected as shown below:

Column 2, line 31, "liminated" should be -- laminated --

Column 3, line 9, after "permit", add -- the unobstructed flow of influent fluid to the full surface --

Column 5, line 16, "are" should be -- as --

Column 9, line 30, "mintue" should be -- minute --

Column 9, line 46, "give" should be -- gives --

Column 10, line 20, "bacterial" should be -- bacteria --

Column 11, line 16, "base" should be -- bases --

Column 11, line 68, "resutling" should be -- resulting --

Signed and sealed this 21st day of March 1972.

(SEAL)
Attest:

EDWARD M. FLETCHER, JR.          ROBERT GOTTSCHALK
Attesting Officer                Commissioner of Patents